March 31, 1953  S. F. PELLAS ET AL  2,633,243
METHOD AND APPARATUS FOR CLARIFYING
AND FILTERING LIQUIDS
Filed Oct. 31, 1946  2 SHEETS—SHEET 1
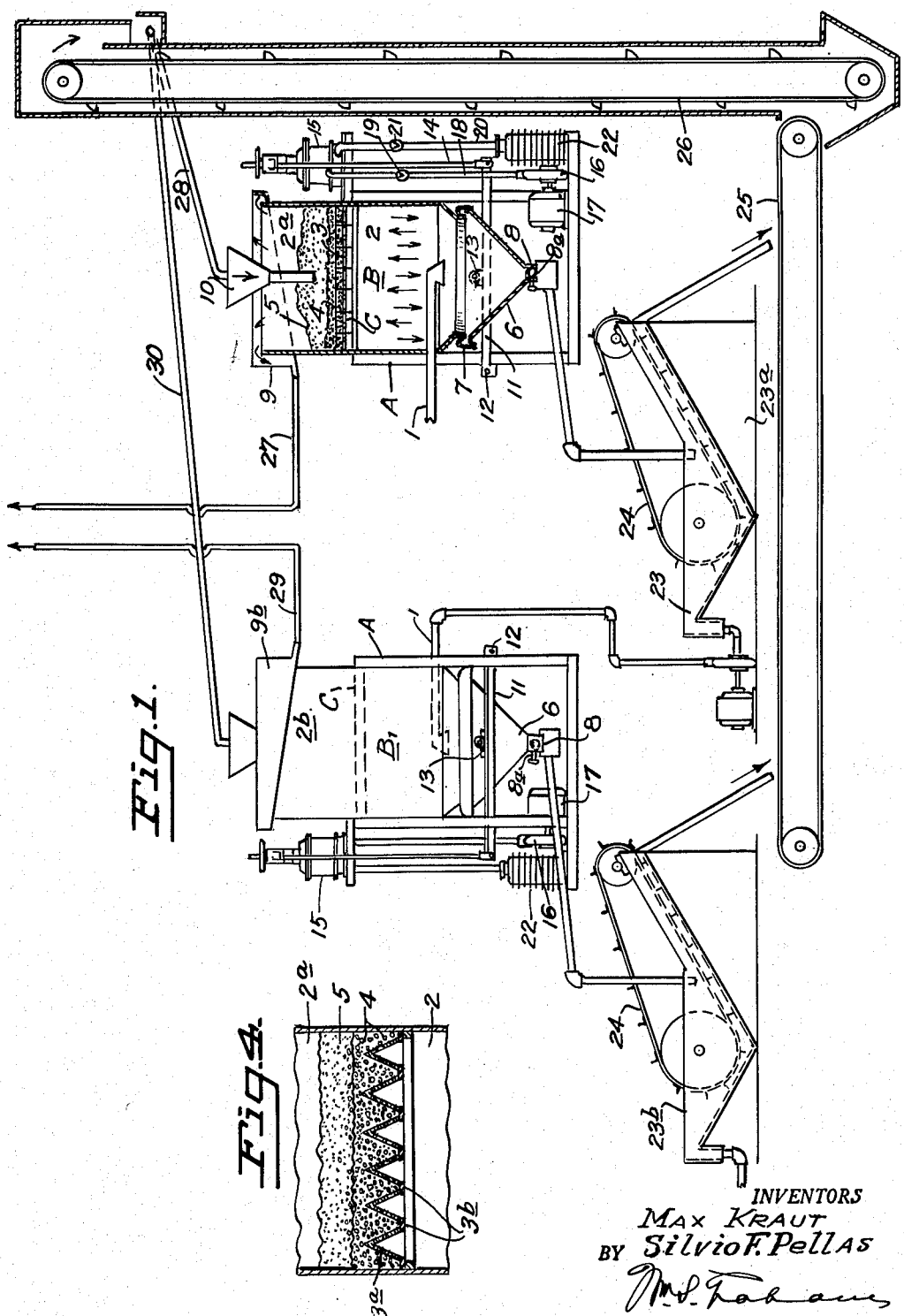
INVENTORS
Max Kraut
BY Silvio F. Pellas
ATTORNEY March 31, 1953     S. F. PELLAS ET AL     2,633,243
METHOD AND APPARATUS FOR CLARIFYING
AND FILTERING LIQUIDS
Filed Oct. 31, 1946     2 SHEETS—SHEET 2

INVENTORS
MAX KRAUT
BY SILVIO F. PELLAS
ATTORNEY

Patented Mar. 31, 1953

2,633,243

UNITED STATES PATENT OFFICE 2,633,243

METHOD AND APPARATUS FOR CLARIFYING AND FILTERING LIQUIDS

Silvio F. Pellas and Max Kraut, San Francisco, Calif.; American Trust Company, a corporation, Alice Mae Pellas, and R. Lloyd Thomas, executors of said Silvio Federico Pellas, deceased Application October 31, 1946, Serial No. 706,916

4 Claims. (Cl. 210—128)

This invention relates to methods and apparatus for clarifying and filtering solid suspensions from liquids.

Broadly, an object of the invention is to provide a filtration process and apparatus adaptable for separating solid suspensions from liquids during an upward flow of the liquid.

More specific objects of the invention are to provide method and apparatus for clarifying solid suspensions from liquids by upward flow of the fluid through a screen-supported granular filter bed of media varying in size, and reversing the direction of flow to draw portions of the filter bed media through the screen for cleaning the screen and filter bed; to provide such methods and apparatus adaptable to a continuous circuit of renewal of filter medium to a filter bed; to provide for control of flow of the liquid being treated; and to generally improve on known methods and apparatus for removing from liquids solid suspensions therein by pulsating the treated fluid rapidly and continuously alternately up and down through a filter medium.

With the foregoing and other objects in view, which will be apparent from the description and drawings herein, one form in which the invention may be advantageously embodied and employed is described and illustrated herein, it being understood that changes in form, shape, size, materials, minor details of steps in the process, and the substitution of equivalents therefor, may be resorted to without departing from the spirit of the invention which is claimed in the appended claims.

In the accompanying drawings which illustrate one form of apparatus by which the method may be practiced, Fig. 1 is a flow sheet in centrally transverse vertical section illustrative of the steps of the process and of an apparatus for accomplishing such steps.

Fig. 4 is a fragmentary transverse vertical section of a modified form of screen whereby screen area is increased.

Figure 3:
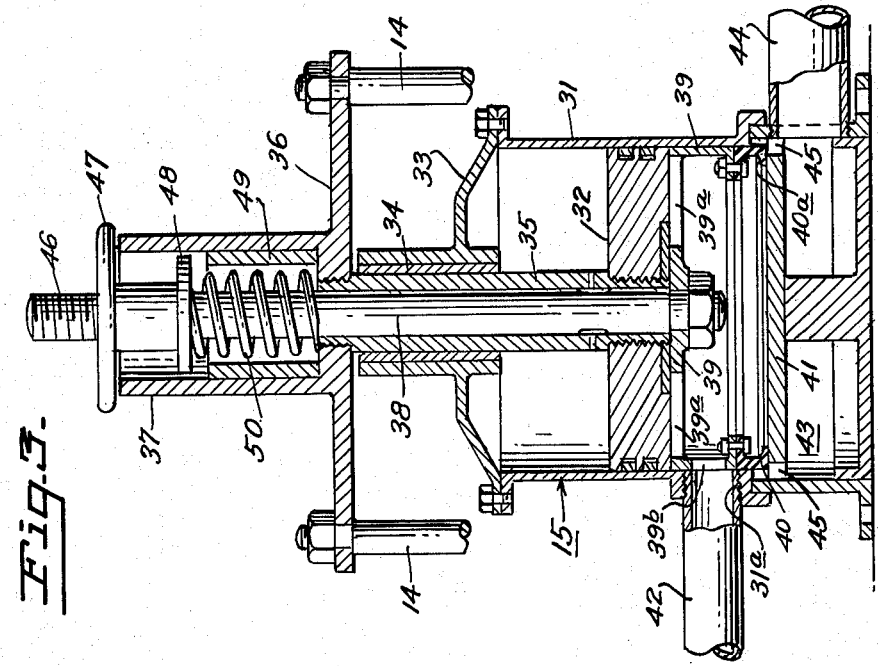
Fig. 3 is a centrally transverse vertical section in enlarged detail of fluid motor shown in Fig. 1.
Figure 2:
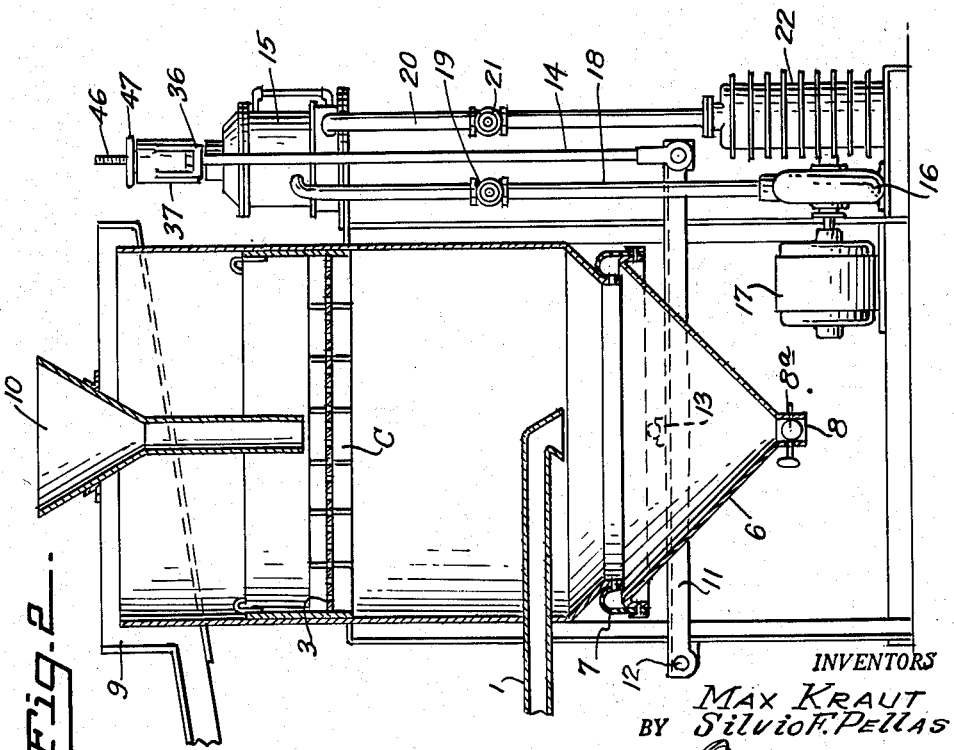
Fig. 2 is a centrally transverse vertical section in enlarged detail of a portion of filter apparatus shown in Figure 1.

The clarification and filtering of a fluid containing liquid solutions of sugar juices having solids suspended therein has been selected as illustrative of one form in which the invention may be advantageously employed, but it is to be understood that the invention is also adaptable to other industries for similar purposes, such as filtering liquid ore pulps, which is a step in ore treatment by the cyanide process. Although in the selected example of operation with liquid sugar juices it is the clarified liquid which is the desired end product, there are also advantageous uses of the invention in which the desired end product would be the solid matter suspended in the liquid.

One important step in the manufacture of sugar from sugar cane is the process of removing from the liquid sugar juices all foreign solid particles held in suspension in the juices. This object of clarification is generally imperfectly accomplished either by various schemes of settling or else by filtering, forcing the juices through fine-mesh metal or canvas screen, aided by covering the screen with a variety of suitable filtering mediums, such as kieselguhr, synthetic resins, etc. The difficulties met in the above methods consist in the fact that settling results only in imperfect removal of solid particles, leaving in suspension very fine bagasse fiber, and attempts of filtering out this bagasse fiber result in rapidly clogging and choking the filter screen, reducing its capacity to a minimum and requiring frequent changes and cleaning of the screen. By this invention these difficulties are overcome and a practical means furnished to accomplish a satisfactory and more economical and efficient clarification of the liquid sugar juices. As related to the clarifying of sugar juices, the invention may be briefly summarized as follows:

The process in this invention comprises the steps of, and the apparatus of the invention provides for, introducing a fluid, such as raw sugar juices, which contain suspended foreign matter, into a chamber below a fine mesh screen which supports a filter bed of relatively coarse and fine sizes of filter material; flowing the fluid to be treated in an upward direction through the fine mesh screen and filter bed, overflowing over the top of the receptacle above the filter bed, the filtered liquid which has passed through the screen and filter bed, and continually maintaining the screen and filter bed free of accumulations of foreign matter by reversing the direction of flow of the liquid through the screen and filter bed, and drawing from the bottom of the receptacle the coagulated suspended foreign matter together with fine filter medium which passes downward through the filter screen, and passing such residual matter into an apparatus or device which in a simple manner separates the fine filter medium of the coagulated suspended foreign matter and scum, such as the bagasse found in sugar juices; the filter medium thus separated being returned to the top of the filter bed to be used over again. The velocity of upwardly induced flow of the fluid through the screen and filter bed is relatively slow comparable to the induced reversed or downward flow, so that the filter bed media is continually pulsated by the fluid alternately upwardly and downwardly, as shown by arrows in Fig. 1. The filtered clear overflow juices pass to the next step in the process of sugar manufacture, usually evaporation, while the coagulated suspended matter, which is diluted with water, passes to a second similar pulsating filter in closed circuit with a similar separating device, from which the fine filtering medium is returned to the top of the second pulsating filter bed, and the coagulated scum from this second filtering operation goes to waste, while the filtered clear overflow of diluted sugar juices from the second filter operation go to the grinding mills for washing purposes, and there join the plant circuit in the process of sugar manufacture.

It is to be understood that the sludge from the second filtering unit may also be passed to additionally successive similar filtering units and again similarly treated; and with some solutions and under some circumstances of price of product, such subsequent filtering treatment may be economically advantageous. But as a practical matter in clarifying and filtering sugar juices on present price basis, it is believed that a second filtering substantially exhausts economical recovery.

Referring to the drawings, in which like reference characters indicate corresponding parts in the several views and in connection with which the steps of the method will be described, A indicates generally a suitable supporting frame and B generally indicates a tank receptacle, preferably cylindrical in lateral transverse section. The receptacle is divided into a lower chamber 2 and upper chamber 2a, said chambers being separated by a filter tray generally indicated C, laterally transverse of, and snugly but removably within, the receptacle B.

The filter tray includes a fixed transverse screen 3, of suitable mesh to permit the treated fluid to pass therethrough and to support a filter medium thereon, for example, approximately 50-mesh for use in the operation of filtering sugar solutions. Upon the screen 3, there is deposited a layer of filter material which for purposes of clarifying sugar juices preferably consists of fairly coarse-grained filter bed medium 4, and superimposed thereon is a layer of relatively fine-grained filter medium 5, the two forming a filter bed. These relative terms of size of mesh and media are more specifically described hereafter.

Means are provided in the lower chamber to continuously vibratingly pulsate the fluid therein successively and alternately upwardly and downwardly through the screen and filter means thereon. To the bottom of lower chamber 2 is attached a conical vessel or hopper 6, by means of an annular flexible concavo-convex ring joint or diaphragm 7. The hopper or conical vessel 6 is provided at the bottom with an outlet 8, which may be controlled by a suitable cut-off valve 8a. At the top of the chamber 2a, of the vertical receptacle B, is provided an overflow launder 9, and also a funnel 10, the latter of which has a spout adapted for reaching down some distance into the filter bed. Due to the flexibility of the annular diaphragm 7, a vertically reciprocating, or successively alternating up-and-down, motion may be imparted to the conical vessel 6 by means of lever 11, which is hinged at 12 and supports the vessel 6 on trunnions 13. The lever 11 is actuated at its opposite end by connected rods 14 which in turn are vertically reciprocated by fluid motor 15 to which the opposite ends of the rods are connected. The conical vessel thus becomes a vertically reciprocated or vibrated pulsator continually operable to successively alternately flow the fluid in the tank upwardly and downwardly through the screen-supported filter means.

Means are provided for regulating the upward and downward movement of the conical hopper 6, and it is recognized that suitable cams may be employed, but for flexibility of operation and adjustment, the fluid motor 15 is a preferred form of such a means.

The fluid motor is designed to control a predetermined regulation of the number of strokes per minute imparted through lever 11 to the conical vessel, and also controls the length of amplitude of the strokes, constancy or uniformity of the speed of the upstroke, and differential of velocity between up and down strokes, all by means of very simple adjustments which can be applied while the apparatus is in operation, as will be explained hereafter in detail. The fluid motor 15 is operated by means of a closed circuit of a circulating motor fluid such as oil or water, to which pressure is imparted through motor pump 16, operated by electric motor 17. The motor fluid is pumped to the fluid motor 15 through pipe 18, the flow being controlled by the valve 19. The motor fluid, after having motivated a piston in the fluid motor, is returned to the pump 16 through pipe 20, controlled by valve 21 and then through air-cooled receiver 22, whereupon it is recirculated to again operate the fluid motor.

In operation the juice or liquid to be filtered enters, preferably in a substantially continuous flow, from the grinding mill through a conduit pipe 1 into the lower chamber 2 of the apparatus under the screen 3 and filter beds 4 and 5, supported on screen 3. The juices enter the lower chamber 2 through feed conduit 1, and reverse flow in said feed conduit may be prevented by any well-known check means or by sufficient pressure to overcome the pressure of the induced upward flow thereof and the resistance of the filter bed and the static head of the liquid up to the overflow launder 9 above the filter bed. The resistance of the filter bed causes all solid particles in the juices to be retained under the filter bed while the clear juices pass through the filter bed and overflow into the launder 9 and pass by any suitable conduit 27 to evaporators, the next step in the process of sugar manufacture.

While the upward and downward movements of the hopper are to be understood as rapid pulsations in predetermined regular sequence, the fluid motor is regulated in such a manner as to impart to the conical hopper 6 a relatively slow and uniform upward movement followed by a comparably rapid downward motion, the vertical reciprocations being continuously successive and alternate in opposite directions. The motion of the upstroke promotes a slow and steady relatively low velocity to the upward current of the fluid through the screen and filter bed without substantially disrupting the respective layers of media in the filter bed. The downward stroke provides a rapid and powerful downward suction current of relatively higher velocity through the filter bed media and screen which carries with it through the coarse filter medium 4 and the screen 3 a stream of particles of the fine filter medium 5 which are of high specific gravity and are finer than the coarse filter medium 4 and the mesh of screen 3. The downward forced flow will include not only portions of the fine-grained filter bed medium but also any fine bagasse and other solids which may have become enmeshed in the filter medium or in the screen meshes on the upstroke. Thus, by successive alternate up and down pulsating reciprocation of the hopper the liquid, and thereby the filter bed, are subjected to continual pulsation, meaning thereby a predetermined measured short quick motion regularly repeated. A small portion of the liquid will obviously be violently sucked back on the downstroke, thus helping to wash the screen meshes free from adhering particles on each downward flow of the fluid.

The stream of fine filter medium, being selected of materials of high specific gravity, which is being sucked through the screen, rapidly sinks to the bottom of the filter in the receiving vessel 6 and carries with it all suspended coarse and fine solid particles, scum and bagasse, and is discharged from the filter apparatus at outlet 8, under the adjustable control of valve 8a. In this manner the downward stream of the heavy fine filter medium removes all suspended solid particles from the juices, permitting only a clear juice to pass upward through the filter bed, and at the same time continually and automatically maintains the screen free and clear, preventing it from becoming clogged and choked by accumulation of bagasse fiber or other foreign matter, which heretofore has required the frequent change or cleaning of the screen and filter bed.

The sludge discharged from outlet 8 of the filter passes to a suitable device 23, several of which are well known, for separating the fine filter media of high specific gravity from the fluid and impurities. Such a device may be a well-known type of shaking table, or as herein exemplified, may be a so-called de-sanding machine wherein the sludge is highly diluted with water. The grains of heavy filtering medium rapidly settle out in trough 23a and are dragged out of the trough by an inclined sand drag 24, and delivered to a traveling conveyor 25, and carried to an elevator 26, from which they are returned through conduit 28 and funnel 10 to the top of the filter bed of the apparatus, where its function as described above is repeated.

The water-diluted sludge from the de-sanding machine 23, containing a small percentage of sugar juices and accumulated waste of fiber or other foreign matter, flows into, or may be suitably pumped, to a second unit B¹ of filter apparatus similar to the one hereinabove described, which is followed by another similar de-sanding machine 23b, and the process described above is repeated in the second unit.

The clear much-diluted juices overflowing the top of the chamber 2b and into the launder 9b of the second unit B¹ pass to the sugar pulp grinding mill through conduit 29 for washing purposes, and join the general plant circuit. The washed fine filter medium from the second separator or de-sanding apparatus is returned to the top of the filter bed in the second apparatus B¹ by conveyor 25, elevator 26 and conduit 30. The overflow sludge from the de-sanding machine of the second unit runs to waste or may be used as fertilizer in the field. The high dilution of the sludge from the second unit reduces the loss of sugar juices going to waste to a minimum.

Having described the steps of the process and a form of apparatus to make it effective, it is to be noted that the selection of suitable filtering media and appropriate mesh of screen are important for successful performance. In the use of a filter bed of coarse and fine filter media in the exemplified clarifying of sugar juices, the screen mesh must be sufficiently fine to support and not pass the coarse filter medium; also it must be a little larger in mesh size than the fine filter medium to permit a lively but not excessive circulation downward of the fines of the filter medium. At the same time a dense filter bed must be maintained which will retain the finest suspended foreign solid particles of waste material on the upward flow. Obviously, there is not maintained a sharply defined line between the respective coarse and fine filter media, since the fine particles work down into and through the coarse particles, and to a lesser degree some of the coarse particles may, on the upward stroke, work into the fine filter medium. Therefore, the term "layers of filter media" must be understood to indicate the predominating character of filter medium in a given zone, the layers forming a filter bed.

For a simple separation of the fine-grained filtering medium from the scum and bagasse in the de-sanding machine the materials of the fine filter medium should be of high specific gravity, such as copper powder, to promote rapid and complete settling.

In Fig. 4 a modified form of screen 3a is disclosed which increases the screen area by providing elongated rows of screen in which each row is formed of vertically inclined converging screen walls which obviously provide greater screen area as compared with a horizontally disposed screen. Crossbars 3b may support the base of the rows. Where this type of screen is employed it will be found more convenient to have the chamber rectangular instead of cylindrical, at least at the portion supporting the screen.

It is also of importance in carrying out the process described above to have a reliable control of the uniformity of the velocity and speed of the up-current and of the rapidity of the down-current in the filter. This control may be readily obtained by means of the fluid motor 15. A description of the parts and operation of this fluid motor is as follows: Within a cylindrical chamber 31 operates slidably reciprocal piston 32. The top of cylinder 31 is closed by cover 33 having an axial opening within which is mounted a bearing 34. Connected to piston 32 is one end of a hollow tubular piston rod 35, which reciprocates in bearing 34 together with the piston and carries at its opposite upper end portion a yoke 36, which combines therewith an axial cylindrical yoke chamber 37. Coaxially within the hollow piston rod 35 is a snugly-fitting sliding shaft 38, to the lower end of which is fixedly mounted a cylindrical sleeve valve 39 snugly reciprocable in the cylinder 31 below the piston 32. Since shaft 38 is slidable in piston rod 35, the piston 32 and sleeve valve 39 may have relatively separate movement. The lower part 40 of sleeve valve 39 is made of resilient material, such as rubber, and is flanged inwardly at a lower lip 40a to provide a tight seat on the bottom 41 of the cylinder chamber 31, the latter being provided with an inlet port 31a, communicating with fluid inlet pipe 42, which in turn communicates with the fluid feed conduit 18. The sleeve valve has a port 39b which communicates with inlet port 31a, and the top of the sleeve valve has ports 39a through which fluid may flow from and into the sleeve valve.

Connected to and below cylinder 31 is another cylindrical chamber 43, designated a discharge chamber, which communicates with outlet pipe 44, and thence with return conduit 20. The cylinder 31 and discharge chamber 43 communicate through an annular peripheral discharge port 45.

The sliding shaft 38 extends upwardly within piston rod 35 and through the yoke 36 and yoke chamber 37. At its upper end the shaft 38 is provided with threads 46 which permit a handwheel 47 with an integral plate 48 to be adjusted upwardly and downwardly thereon, the plate 48 being spaced downwardly from the handwheel into the cylindrical yoke chamber 37. Within chamber 37 is loosely and slidably disposed an annular sleeve 49, of suitable diameter to engage plate 48 when the sleeve 49 is raised. Freely within the annular sleeve there is a coil spring 50, which surrounds the sliding shaft 38, and in repose is of greater length than the annular sleeve 49. The spring 50 and the sleeve 49 both seat at the bottom of the yoke chamber 37, the opposite end of the spring having bearing upon the handwheel plate 48. One end of each of the vertical rods 14 is connected to the yoke 36 for reciprocation vertically by movement thereof.

In operation of the fluid motor, fluid (oil or water) from feed conduit 18 enters under pressure of pump 16 through inlet pipe 42 and flows into the cylinder chamber 31 through inlet ports 31a and 39b and through sleeve valve ports 39a, and thus acts on piston 32, by raising it together with hollow piston rod 35 and the attached yoke 36 and yoke chamber 37 mounted thereon. While piston 32 is rising, the sleeve valve 39 is held down firmly against bottom 41 of chamber 31 by the fluid pressure on the inwardly projected resilient flange 40a of the lower end of the sleeve valve. Responsive to continued pressure, the piston 32 continues to rise until the annular sleeve 49 engages plate 48 of handwheel 47. Before sleeve ring 49 engages plate 48, the spring 50 becomes compressed by upward movement of cylinder chamber 37, and the spring thus exerts a limited pressure on plate 48, but not sufficient to initiate a movement of sleeve valve 39 from its seat. However, as the piston continues to raise cylinder 37, the annular sleeve 49 engages plate 48, whereupon the sleeve valve 39 is positively lifted from its seat, breaking the pressure engagement between lip 40a and bottom 41, and thereby opening the annular discharge port 45. The opening of discharge port 45 immediately releases the upward fluid pressure on the piston 32, and the precompression of spring 50 immediately, as by tensional spring action, moves the sleeve valve upwardly and throws sleeve valve discharge port 45 wide open, partially closing the inlet port 31a, and causing a sudden rapid discharge of the fluid from cylinder 31 through port 45 into discharge chamber 43, from where it is discharged to the pipe outlet 44, and thence through the conduit 20 back to pump 16 for re-circulation. The fluid pressure in cylinder 31 being released, the weight of the load carried by yoke 36 then forces the piston rapidly downward and pushes with it the sleeve valve 39 down to its seat on bottom 41, thus closing the annular outlet port 45 and fully opening the inlet port 31a and its communication with inlet port 39b of the sleeve valve. The cycle of operation is then repeated.

Thus, since the raising and lowering of yoke 36 also raises and lowers the connected rods 14, the raising and lowering of the lever 11 and thereby the conical hopper 6 and the pulsation of the liquid juices in chamber 2 and the filter media are controlled and regulated by the fluid motor 15 in providing successive alternate upward and downward flow through the filter assembly.

The speed or velocity of the upstroke is readily controlled by means of the valve 19 on feed conduit 18 to the inlet ports 31a and 39b. The shock, speed or velocity of the downstroke may be regulated or cushioned by means of valve 21 on outlet pipe 20 from the outlet 44, or else by suitable spring resistance on yoke 36. The length of the upward piston stroke before opening the discharge port 45 is readily adjusted and made shorter or longer by screwing hand-wheel 47 up or down, which shortens or lengthens the distance between the top of annular sleeve 49 and the plate 48, which distance determines the length of the stroke. In this manner complete control of the current in the filter may be obtained by simple and ready adjustment in the operation of the fluid motor.

The apparatus and process herein described can also be applied in the process of refining sugar by treating the re-melted juices with activated carbon to remove all turbidity and filter out suspended carbon particles by passing the juices through the filter as described above.

Other uses may be found for the process or apparatus in other industries, and the description of the process and apparatus in connection with the filtering of sugar juices is intended as one exemplification only, without intending to limit the invention to this particular use.

Having described the invention, we claim:

1. A method of clarifying and filtering solid suspensions from a liquid, including the steps of inducing the liquid containing the suspension to flow into a receptacle below a screen-supported filter bed of loose coarse and fine filter media, inducing a forced upward flow of the liquid through the screen and filter bed, removing liquid at its upper level above the filter bed after it has passed through the filter bed, reversing the direction of flow of the liquid whereby accumulation of solid matter is cleared from the screen and filter bed and a portion of the fine filter media is induced to flow downward through the screen into the said receptacle, removing from the said receptacle the combined accumulated solid matter and fine filter medium with a portion of the liquid, and diluting it, and separating the said fine filter medium therefrom and returning the separated filter medium to the top of the filter bed, said upward and downward flows of liquid being successively alternate in continuous pulsations, and a greater velocity being induced in said downward flow.

2. A method of clarifying and filtering solid suspensions from a liquid, including the steps of inducing liquid containing the suspensions to flow into a receiving receptacle below a screen-supported filter bed of loose coarse and fine filter media, inducing a forced upward flow of the liquid through the screen and filter bed, removing liquid at its upper level above the filter bed after it has passed through the screen and filter bed, reversing the direction of flow of the liquid whereby accumulations of solid matter is cleared from the screen and filter bed, successively and continuously in predetermined regulated sequence alternating the direction of flow upwardly and downwardly while providing a differential in the rate of the respective upward and downward flows in which the velocity is greater on the downward flow than on the upward flow, inducing a downward flow into said receiving receptacle of a portion of the fine filtering material with the downward flow of liquid, removing from said receiving receptacle the said accumulated solid matter and filter medium and diluting it to a thinner liquid, and separating the included filter medium therefrom and returning the separated filter medium to the filter bed.

3. An apparatus for filtering solid suspensions from a liquid, comprising a vertically disposed receptacle for holding the liquid, a filter screen for supporting the filter bed media mounted intermediate the ends of the receptacle and providing an upper and lower chamber therein, a filter bed mounted on said screen including loose fine filter media which will pass through the screen, means for feeding into the lower chamber a supply of liquid to be filtered, pulsator means for continually pulsatively forcing the liquid alternately upwardly and downwardly, respectively, between the lower chamber and the upper chamber through the filter media, regulating means adapted for effecting a greater velocity in flow of fluid downwardly than upwardly, the lower portion of the lower chamber having an outlet for discharge of liquid sludge therefrom, a separator device for receiving the sludge discharge from said outlet and separating the filter medium from the liquid sludge, and means for returning the separated filter medium to the filter bed mounted on said screen.

4. Apparatus of the character described, comprising a vertically disposed receptacle for holding a liquid, a filter screen mounted transversely intermediate the ends of the receptacle and providing an upper and lower chamber in the receptacle, a filter bed of loose filter media reposing on said screen, a portion of said filter media being sufficiently fine to pass through the screen, means for feeding into the lower chamber a supply of liquid to be filtered, vertically reciprocable pulsating means for continually alternately and successively forcing the liquid upwardly and downwardly respectively through the screen and filter media, means for effecting a greater velocity in the downward flow than in the upward flow of the fluid, the lower portion of the lower chamber having an outlet for discharging liquid sludge therefrom, means for separating filter medium from said liquid received from said last-mentioned opening, and means for returning the separated filter medium to the filter bed.

SILVIO F. PELLAS.
MAX KRAUT.

REFERENCES CITED

The following references are of record in the file of this patent:

UNITED STATES PATENTS

| Number | Name | Date |
|---|---|---|
| 47,251 | Espirat et al. | Apr. 11, 1865 |
| 335,602 | Matthiessen | Feb. 9, 1886 |
| 335,622 | Quimby | Feb. 9, 1886 |
| 825,931 | Obert | July 17, 1906 |
| 872,033 | Waite | Nov. 26, 1907 |
| 1,214,152 | Genter | Jan. 30, 1917 |
| 1,263,226 | Genter | Apr. 16, 1918 |
| 1,269,700 | Genter | June 18, 1918 |
| 1,354,604 | Duggan | Oct. 5, 1920 |
| 1,452,151 | Genter et al. | Apr. 17, 1923 |
| 1,465,931 | Collins | Aug. 28, 1923 |
| 1,574,558 | Coe | Feb. 23, 1926 |
| 1,575,907 | Genter | Mar. 9, 1926 |
| 1,662,180 | Ball | Mar. 13, 1928 |
| 1,688,012 | Gray | Oct. 16, 1928 |
| 1,843,212 | De Pree et al. | Feb. 2, 1932 |
| 1,861,469 | Curtis | June 7, 1932 |
| 1,995,559 | Andrews | Mar. 26, 1935 |
| 2,035,592 | Christensen | Mar. 21, 1936 |
| 2,129,795 | Storsand | Sept. 13, 1938 |
| 2,135,957 | Wuensch | Nov. 8, 1938 |
| 2,242,020 | Wood | May 13, 1941 |
| 2,265,741 | Morse | Dec. 9, 1941 |
| 2,294,697 | Seip | Sept. 1, 1942 |
| 2,319,608 | Kraut | May 18, 1943 |
| 2,325,149 | Rakowsky et al. | July 27, 1943 |
| 2,344,094 | Kraut | Mar. 14, 1944 |